US011536968B2

(12) United States Patent
Tohara

(10) Patent No.: US 11,536,968 B2
(45) Date of Patent: Dec. 27, 2022

(54) IMAGE DISPLAY APPARATUS

(71) Applicant: CANON KABUSHIKI KAISHA, Tokyo (JP)

(72) Inventor: Masakazu Tohara, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 91 days.

(21) Appl. No.: 17/150,236

(22) Filed: Jan. 15, 2021

(65) Prior Publication Data
US 2021/0239985 A1 Aug. 5, 2021

(30) Foreign Application Priority Data
Jan. 31, 2020 (JP) .............................. JP2020-015848

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01); *G02B 2027/0112* (2013.01)

(58) Field of Classification Search
CPC .............. G02B 27/017; G02B 27/0172; G02B 27/283; G02B 2027/20112
See application file for complete search history.

(56) References Cited

U.S. PATENT DOCUMENTS

| 2017/0019602 A1* | 1/2017 | Dopilka .............. G02B 27/0101 |
| 2019/0018255 A1* | 1/2019 | Qin ...................... G02B 27/283 |
| 2019/0155037 A1* | 5/2019 | Matsumura .......... G02B 27/022 |
| 2020/0158953 A1 | 5/2020 | Tohara et al. |
| 2020/0192079 A1 | 6/2020 | Tohara et al. |
| 2021/0231957 A1 | 7/2021 | Taketani et al. |

FOREIGN PATENT DOCUMENTS

| CN | 111025660 A * | 4/2020 | ......... G02B 27/0101 |
| JP | 2019-053152 A | 4/2019 | |
| JP | 2019-61198 A | 4/2019 | |
| WO | 2017/169563 A1 | 10/2017 | |

* cited by examiner

*Primary Examiner* — Alexander Eisen
*Assistant Examiner* — Cory A Almeida
(74) *Attorney, Agent, or Firm* — Carter, DeLuca & Farrell LLP

(57) ABSTRACT

The image display apparatus includes an optical system configured to introduce light from a display surface of a display element to an observer. The optical system includes in order from the display element toward the observer, a first phase plate, a semi-transmissive reflective surface, a lens, a second phase plate, and a polarization beam splitter. The display element is configured to make, at a central portion of the display surface, luminance in a normal direction in which a normal to the display surface extends higher than that in a specific direction tilted outward with respect to the normal direction, and to make, at a most edge portion of the display surface, the luminance in the normal direction lower than that in the specific direction.

18 Claims, 10 Drawing Sheets

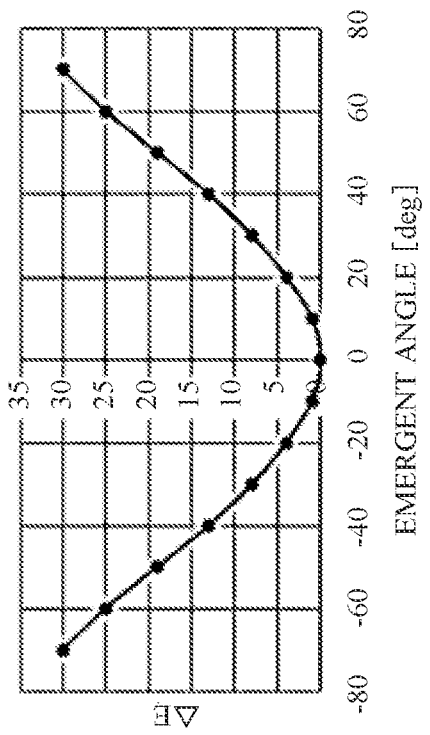
FIG. 5A
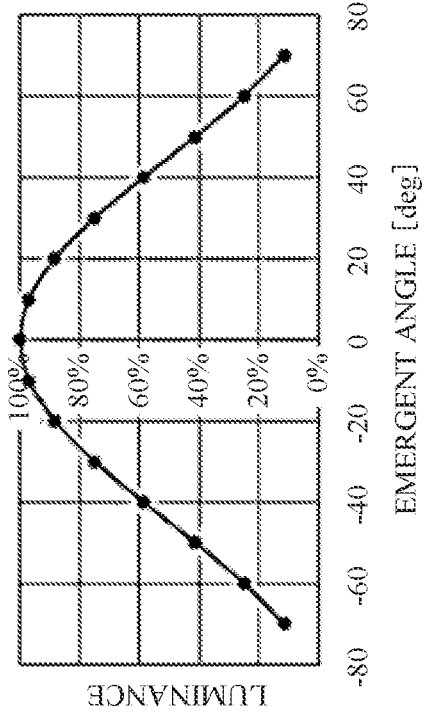
FIG. 5B
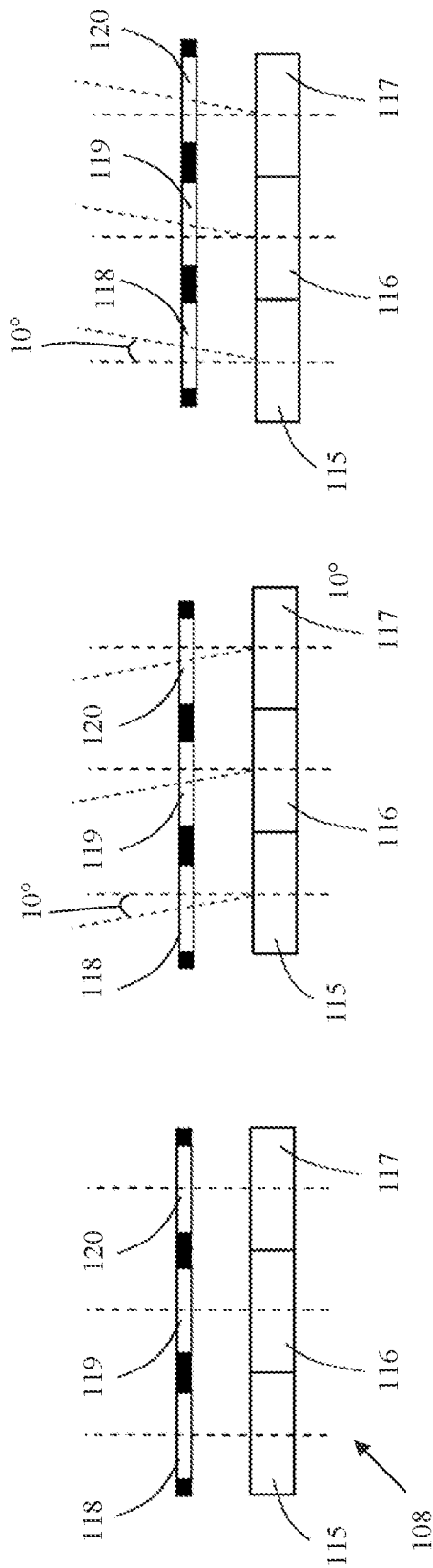
FIG. 6A
FIG. 6B
FIG. 6C

IMAGE DISPLAY APPARATUS

BACKGROUND OF THE INVENTION

Field of the Invention

The present invention relates to an image display apparatus enabling an observer to observe an image displayed on a display element through an ocular optical system.

Description of the Related Art

As the above-mentioned image display apparatus, a head-mounted display (HMD) is provided that is mounted on an observer's head. In order to realize image presentation at a wide view angle in such an HMD, an ocular optical system that folds an optical path by utilizing polarization of light may be used. However, such an ocular optical system has a short focal length, so that an emergent angle of light from the display element at a marginal view angle becomes large, which is likely to deteriorate viewing angle characteristics (luminance and chromaticity shift) of the display element. Further, when a plastic lens is used for weight reduction in such an ocular optical system, a polarization state alight is disturbed by birefringence in the plastic lens, which results in generation of ghost.

Japanese Patent Laid-Open Nos. 2019-053152 and 2019-61198 each disclose an HMD having an ocular optical system providing a wide view angle by utilizing polarization of light. Further, Japanese Patent Laid-Open No. 2019-61198 discloses that viewing angle characteristics at a marginal view angle are improved by increasing sizes of color filters provided in a display element from its central portion to its marginal portion.

However, in the HMD disclosed in Japanese Patent Laid-Open No, 2019-61198, centers of a light source and the color filters coincide with each other, and thereby the viewing angle characteristics in a normal direction of the display element are good, so that it is impossible to reduce the ghost due to the lens's birefringence.

SUMMARY OF THE INVENTION

The present invention provides an image display apparatus capable of reducing ghost while improving viewing angle characteristics at a marginal view angle of an ocular optical system using polarization of light.

The present invention provides as an aspect thereof an image display apparatus including a display element having a display surface configured to display an image, and an optical system configured to introduce light from the display surface to an observer. The optical system includes in order from the display element toward the observer, a first phase plate, a semi-transmissive reflective surface, a lens, a second phase plate, and a polarization beam splitter configured to reflect a first linearly polarized light and transmit a second linearly polarized light whose polarization direction is orthogonal to that of the first linearly polarized light. When a direction in which a normal to the display surface extends is referred to as a normal direction, and a direction tilted outward of the display surface with respect to the normal direction is referred to as a specific direction, the display element is configured to make, at a central portion of the display surface, luminance in the normal direction higher than that in the specific direction, and to make, at a most edge portion of the display surface, the luminance in the normal direction lower than that in the specific direction.

The present invention provides as another aspect thereof an image display apparatus in which the display element is configured to make, at the central portion of the display surface, color shift in the normal direction smaller than that in the specific direction, and to make, at the most edge portion of the display surface, the color shift in the normal direction larger than that in the specific direction.

Further features of the present invention will become apparent from the following description of exemplary embodiments with reference to the attached drawings.

BRIEF DESCRIPTION OF THE DRAWINGS

FIGS. 5A and 5B illustrate viewing angle characteristics at a central portion of a display surface in Embodiment 1.

FIGS. 6A to 6C illustrate color filters in Embodiment 1.

DESCRIPTION OF THE EMBODIMENTS

Exemplary embodiments of the present invention will hereinafter be described with reference to the accompanying drawings.

Embodiment 1

Figure 1:
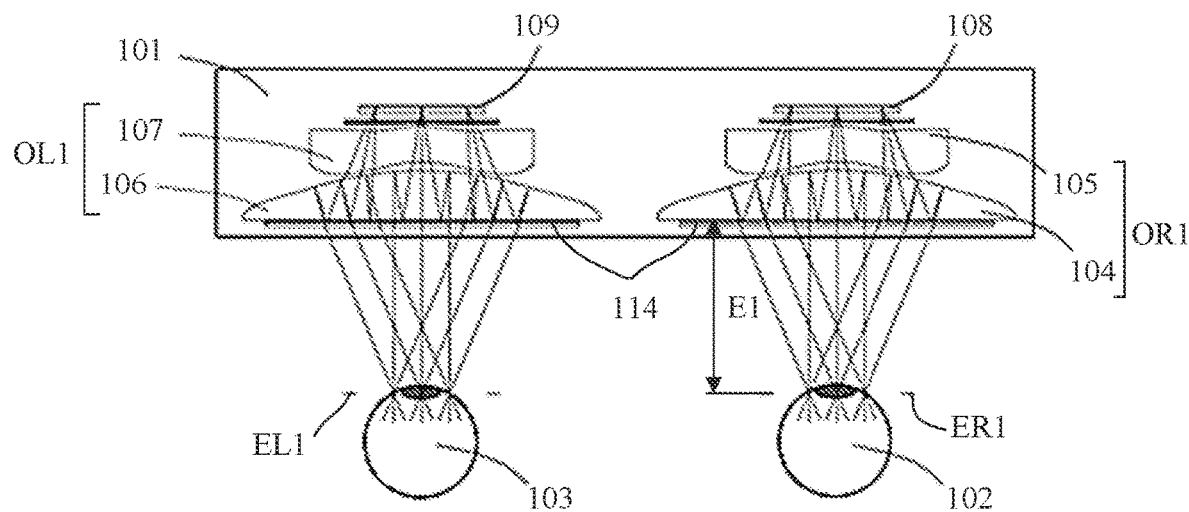
FIG. 1 illustrates a configuration of an HMD of Embodiment 1 of the present invention.

FIG. 1 illustrates a configuration of an HMD 101 as an image display apparatus (or an image observation apparatus) that is a first embodiment (Embodiment 1) of the present invention. The HMD 101 is mounted (worn) on an observer's head. Reference numeral 102 denotes an observer's right eye, and reference numeral 103 denotes an observer's left eye. Display lenses 104 and 105 are included in a right-eye ocular optical system OR1, and display lenses 106 and 107 are included in a left-eye ocular optical system OL1. Each ocular optical system is a coaxial optical system including multiple (two) display lenses. The observer's right eye 102 is disposed at an exit pupil ER1 of the right-eye ocular optical system OR1, and the observer's left eye 103 is disposed at an exit pupil EL1 of the left-eye ocular optical system OL1.

Figure 3:
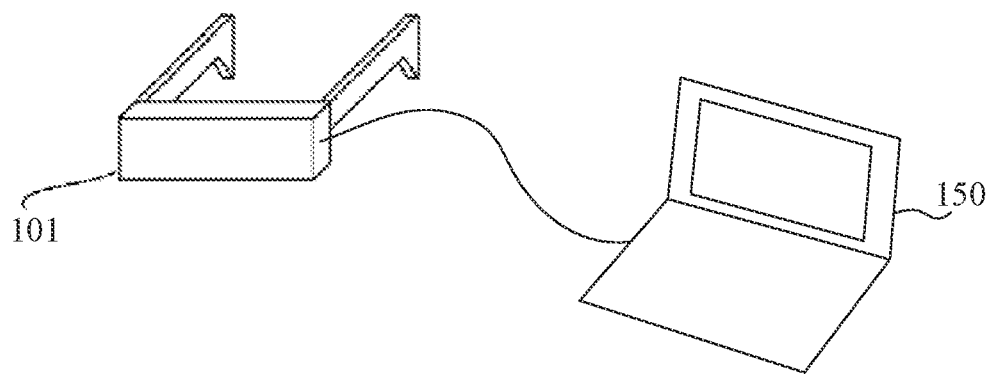
FIG. 3 is an external view of the HMD of Embodiment 1.

Reference numeral 108 denotes a right-eye display element, and reference numeral 109 denotes a left-eye display element. Each display element is a flat plate display element. In this embodiment, an organic EL display panel is used as each display element. FIG. 3 illustrates an external view of the HMD 101 and a personal computer 150 connected to the HMD 101. Each display element displays a display image (original image) corresponding to an image signal output from the personal computer 150.

The ocular optical systems OR1 and OL1 respectively introduce lights from the display elements 108 and 109 to the exit pupils ER1 and EL1 to project magnified virtual images of the display images onto the observer's right eye 102 and left eye 103. As a result, the observer can observe the virtual images of the display images displayed on the display elements 108 and 109 through the ocular optical systems OR1 and OL1.

In this embodiment, each ocular optical system has a focal length of 12 mm, a horizontal display view angle of 45°, a vertical display view angle of 34°, and a diagonal display view angle of 54°. An eye relief E1 that is a distance between a most exit pupil-side surface of each ocular optical system (that is, an exit pupil-side surface of a polarization beam splitter 114 described later) and the exit pupil of each ocular optical system is 18 mm.

Figure 2:
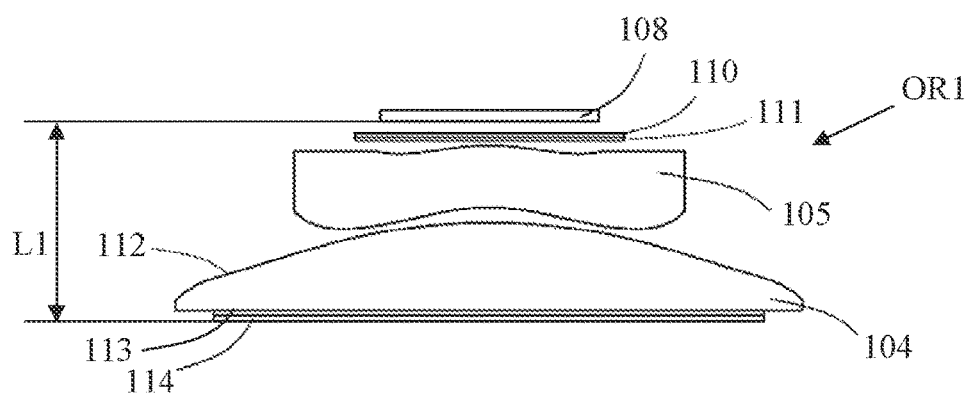
FIG. 2 illustrates a configuration of an ocular optical system in Embodiment 1.

Each of the right-eye and left-eye ocular optical systems OR1 and OL1 in this embodiment is an optical system that folds an optical path by utilizing polarization of light. Description will hereinafter be made of a configuration of the right-eye ocular optical system OR1. The left-eye ocular optical system OL1 has the same configuration as that of the right-eye ocular optical system OR1. As illustrated in FIG. 2, the right-eye ocular optical system OR1 includes, in order from the right-eye display element 108 toward the exit pupil ER1 (that is, toward the observer), a polarizing plate 110, a first λ/4 plate (first phase plate) 111, the display lens 105, the display lens 104, a second λ/4 plate (second phase plate) 113, and the polarization beam splitter (hereinafter referred to as "PBS") 114. On a display element-side convex-shape surface of the display lens 104, a half mirror 112 as a semi-transmissive reflective surface is formed by vapor deposition. Further, the second λ/4 plate 113 and the PBS 114 are provided so as to be laminated on an exit pupil-side surface of the display lens 104.

The polarizing plate 110, the first λ/4 plate 111, the second λ/4 plate 113 and the PBS 114 are all formed in a flat plate shape. A polarization direction of a first linearly polarized light to be transmitted through the polarizing plate 110 is tilted with respect to a slow axis of the first λ/4 plate 111 by 45°. The polarization direction of the first linearly polarized light to be transmitted through the polarizing plate 110 is tilted with respect to a slow axis of the second λ/4 plate 113 by −45°, in other words, the polarization direction of the first linearly polarized light is tilted with respect to the slow axis of the second λ/4 plate 113 by the same angle to the opposite side with respect to the slow axis of the first λ/4 plate 111. Further, the polarization direction of the first linearly polarized light to be transmitted through the polarizing plate 110 and a polarization direction of a second linearly polarized light to be transmitted through the PBS 114 are orthogonal to each other.

Non-polarized light emerging (emitted) from the right-eye display element 108 is transmitted through the polarizing plate 110 to become linearly polarized light. The linearly polarized light is transmitted through the first λ/4 plate 111 to become circularly polarized light. The circularly polarized light is transmitted through the display lens 105, the half mirror 112 and the display lens 104, and then is transmitted through the second λ/4 plate 113 to become the first linearly polarized light.

This first linearly polarized light has the polarization direction orthogonal to the polarization direction to be transmitted through the PBS 114, and therefore is reflected by the PBS 114, and then is transmitted through the second λ/4 plate 113 to become circularly polarized light. This circularly polarized light is transmitted through the display lens 104, is reflected by the half mirror 112, is transmitted through the display lens 104 again, and then is transmitted through the second λ/4 plate 113 to become the second linearly polarized light. This second linearly polarized light has the polarization direction that coincides with the polarization direction to be transmitted through the PBS 114, and therefore is transmitted through the PBS 114 to be introduced to the exit pupil ER1 (right eye 102). Light emitted from the left-eye display element 109 is similarly introduced to the exit pupil EL1 (left eye 103) by the left-eye ocular optical system OL1.

Such a configuration in which each ocular optical system folds the optical path using the polarization of light enables making each ocular optical system thin in its optical axis direction, and enables shortening the focal length of each ocular optical system so as to be able to observe a wide-view angle image.

It is desirable that the HMD 101 be lightweight because the observer wears it on his/her head. Therefore, it is desirable that the display lenses included in the ocular optical system be made of a resin material having a specific gravity smaller than that of glass. Thus, also in this embodiment, the display lenses 104 to 107 are resin lenses.

Further, in this embodiment, the display lenses 104 and 106 that are most exit pupil-side lenses (that is, lenses closest to the observer) are each a plano-convex lens having a convex-shape surface toward the display element, and the half mirror 112 is provided on the convex-shape surface. This configuration realizes a wide view angle while thinning the ocular optical system. Moreover, the convex-shape surfaces of the display lenses 104 and 106 each have an aspherical shape, which enhances their aberration correction effect. Furthermore, the display lenses 105 and 107 are each a resin-made double-sided aspherical lens, which enhances their aberration correction effect.

However, since the display lenses 105 and 107 have a small outer diameter, and therefore have a small influence on its weight, they may be each a glass lens. Further, if the total weight of the HMD 101 is within an allowable range, the display lenses 104 and 106 may also be glass lenses.

In the HMD 101 of this embodiment, it is desirable that the eye relief E1 be 15 mm or more such that an observer wearing glasses can wear the HMD 101. However, if the eye relief is too long, the outer shape of the display lens becomes large, and thereby the size of the 101 also becomes large. Therefore, it is desirable that the eye relief E1 be 25 mm or less. That is, it is desirable that the eye relief E1 satisfy the following condition:

$$15 \text{ mm} \leq E1 \leq 25 \text{ mm}. \tag{1}$$

Figure 4:
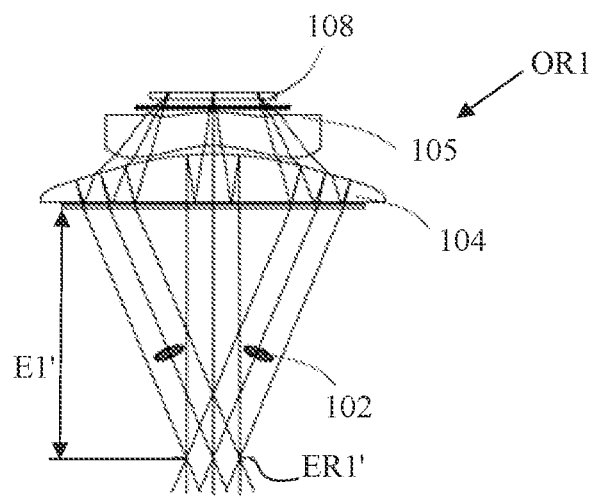
FIG. 4 is an optical path diagram of the ocular optical system in Embodiment 1.

Further, in the HMD 101 of this embodiment, as illustrated in FIG. 4, in a state where an eyeball (pupil) of the right eye 102 faces (sees) most edge portions in a right-and-left direction (the most edge portion is hereinafter simply referred to as "an edge portion") of a display surface of the right-eye display element 108, a position of an exit pupil ER1' of the right-eye ocular optical system OR1, that is, an eye relief E1' is set to 28 mm. This eye relief E1' (=28 mm)

is the sum of the eye relief E1 (=18 mm) when the eyeball faces the center of the display surface as illustrated in FIG. 1 and a rotation radius of 10 mm of the eyeball. An exit pupil diameter is set to 6 mm. The same applies to the exit pupil of the left-eye ocular optical system OL1. Such setting makes it possible to cause light from a direction in which the eyeball faces to enter the eyeball even if the eyeball is rotated to observe the left and right edge portions (similarly, upper and lower edge portions) of the display surface.

In the ocular optical system of this embodiment having a long eye relief, a short focal length and being a thin ocular optical system, an emergent angle of light from the display element (display surface) at a marginal view angle of the display view angle becomes large. Such a large light emergent angle from the display surface deteriorates viewing angle characteristics such as display luminance and display chromaticity, which makes the observed image dark or makes it impossible to observe a correct color image.

In the right-eye ocular optical system OR1, a light ray emitted from the right-eye display element (display surface) 108 and passing through the center of the exit pupil ER1 (ER1') of the right-eye ocular optical system OR1 is referred to as "a principal ray". In this embodiment, when the eyeball faces the center of the display surface as illustrated in FIG. 1, a principal ray of a maximum marginal view angle of 22.5° in the right-and-left (horizontal) direction emits from the display surface at an emergent angle of 18°. On the other hand, when the eyeball faces the horizontal edge portion of the display surface as illustrated in FIG. 4, the principal ray of the maximum marginal view angle of 22.5° in the horizontal direction emits from the display surface at an emergent angle of 37°.

In this case, the viewing angle characteristics, that is, luminance (brightness) and chromaticity shift (color shift ΔE) of the display element having a general configuration are as illustrated in FIGS. 5A and 5B. As the emergent angle of light from the display surface increases, the luminance decreases and the color shift increases.

In this embodiment, the display elements 108 and 109 are configured as illustrated in FIGS. 6A to 6C. Although description is herein made of the configuration of the right-eye display element 108 in the horizontal direction, the same applies to the left-eye display element 109.

The display element 108 in this embodiment includes multiple red, green and blue sub-pixels 115, 116 and 114 and multiple red, green and blue color filters 118, 119 and 120 corresponding thereto. The red, green and blue sub-pixels and color filters are arranged in a stripe shape and periodically in an in-plane direction (horizontal and vertical directions) of the display surface. The sub-pixels and color filters may be arranged in a square or hexagonal shape in the in-plane direction of the display surface. In this embodiment, a direction in which a normal to the display surface of the display element 108 extends (hereinafter, referred to as "a normal direction") is defined as a 0° direction. Further, when viewing from the right eye 102, a right side is defined as positive, and a left side is defined as negative.

As illustrated in FIG. 6A, at a central portion of the display element 108, the center of the red color filter 118 is located in the normal direction from the center of the red sub-pixel 115 as in general display elements. That is, in the horizontal direction, the center position of the red color filter 118 coincides with the center position of the red sub-pixel 115. Similarly, in the horizontal direction, the center position of the green color filter 119 coincides with the center position of the green sub-pixel 116, and the center position of the blue color filter 120 coincides with the center position of the blue sub-pixel 117. In other words, the center of the color filter corresponding to the sub-pixel is disposed on the normal to the center of the sub-pixel.

On the other hand, as illustrated in FIG. 6B, at the left edge portion of the display element 108 when viewed from the right eye 102, the center of the red color filter 118 is disposed so as to be shifted leftward (outward) with respect to the center of the red sub-pixel (second pixel) 115. In other words, at the edge portion of the display surface, the center of the color filter corresponding to the sub-pixel is shifted outward with respect to the normal to the center of the sub-pixel. The center of the red color filter 118 is shifted with respect to the center of the red sub-pixel 115 by a shift amount by which a straight line passing through the center of the red sub-pixel 115 and the center of the red color filter 118 is tilted leftward with respect to the normal direction by 10°. In the following description, this shift amount is referred to as "a leftward (outward) color filter shift amount of 10°". The same applies to the green color filter 119 and the blue color filter 120.

Further, as illustrated in FIG. 6C, at the right edge portion of the display element 108 when viewed from the right eye 102, the center of the red color filter 118 is disposed so as to be shifted rightward (outward) with respect to the center of the red sub-pixel 115. The center of the red color filter 118 is shifted with respect to the center of the red sub-pixel 115 by a shift amount by which a straight line passing through the center of the red sub-pixel 115 and the center of the red color filter 118 is tilted rightward with respect to the normal direction by 10°. In the following description, this shift amount is referred to as "a rightward (outward) color filter shift amount of 10°". The same applies to the green color filter 119 and the blue color filter 120.

Figure 7A:
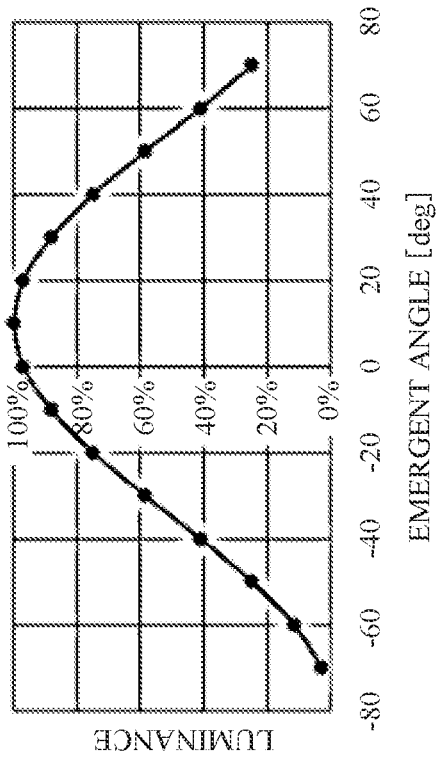
FIGS. 7A to 7D illustrate viewing angle characteristics at a horizontal end of the display surface in Embodiment 1.
Figure 7B:
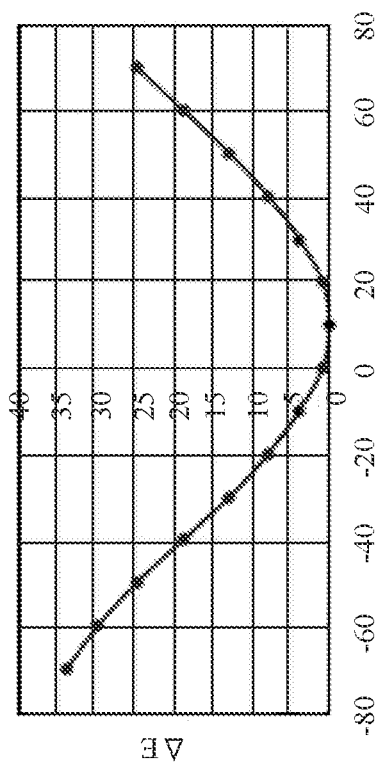

The luminance and color shift of the display element 108 having such a configuration are respectively as illustrated in FIGS. 7A and 7B, and become best in a direction of −10° as a specific direction.

The emergent angle of the principal ray from the left edge portion of the display element (display surface) 108 to the ocular optical system OR1 is −18° when the eyeball of the right eye 102 faces the center of the display surface (hereinafter referred to as "in a front viewing state"), and is −37° when the eyeball faces the left edge portion of the display surface (hereinafter referred to as "in a left edge viewing state").

If the color filter is not shifted with respect to the sub-pixel at the left edge portion of the display surface in the front viewing state, as can be seen from FIGS. 5A and 5B, the luminance decreases by 10%, and ΔE increases by 3. However, when the color filter is shifted, as can be seen from FIGS. 7A and 7B, the luminance decreases by only 2%, and ΔE increases by only 1. That is, the viewing angle characteristics are improved.

On the other hand, if the color filter is not shifted at the left edge portion of the display surface in the left edge viewing state, as can be seen from FIGS. 5A and 5B, the luminance decreases by 36%, and ΔE increases by 12. However, when the color filter is shifted, as can be seen from FIGS. 7A and 7B, the luminance decreases by only 21%, and ΔE increases by only 7. That is, the viewing angle characteristics are improved.

Figure 7C:
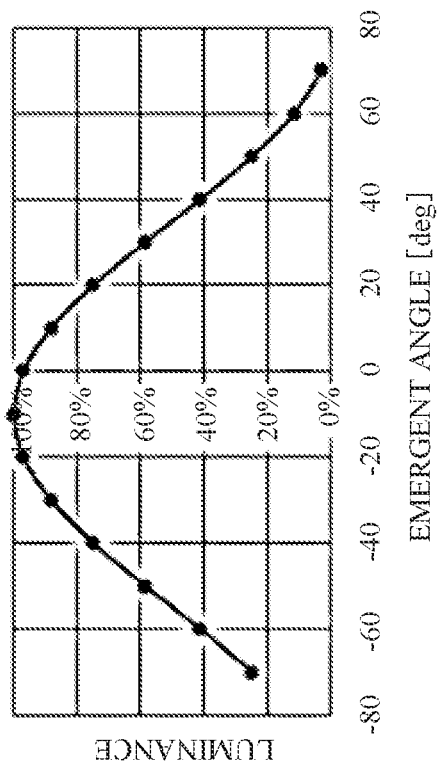
Figure 7D:
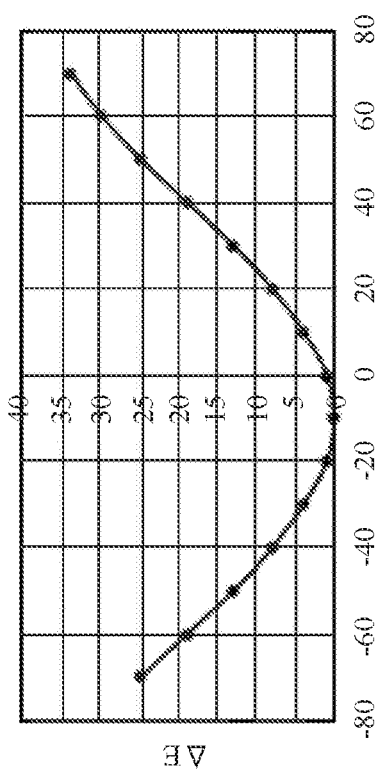

Further, also in a right edge viewing state in Which the eyeball of the right eye 102 faces the right edge portion of the display surface, as illustrated in FIGS. 7C and 7D, as in the left edge viewing state, shifting the color filter with respect to the sub-pixels improves the luminance and color shift compared to the case where the color filter is not shifted with respect to the sub-pixel.

The description has been made of the shift of the color filter with respect to the sub-pixel at the horizontal edge portions. In this embodiment, also at the vertical edge portions (that is, the upper and lower edge portions), the color filter is similarly shifted with respect to the sub-pixel.

In this embodiment, the emergent angle of the principal ray of the maximum marginal view angle of 17° in the vertical direction from the display element (display surface) 108 in the front viewing state is 14°. When the eyeball faces the upper edge portion and the lower edge portion (hereinafter respectively referred to as "in an upper edge viewing state" and "in a lower edge viewing state"), the emergent angle of the principal ray of the maximum marginal view angle of 17° in the vertical direction from the display surface is 29°.

At the upper edge portion of the display surface, the center of the red color filter 118 is disposed at a position shifted upward (outward) with respect to the center of the red sub-pixel 115. The shift amount of the center of the red color filter 118 with respect to the center of the red sub-pixel 115 is set such that a straight line passing through the center of the red sub-pixel 115 and the center of the red color filter 118 tilts upward with respect to the normal direction by 7.5°. In the following description, this shift amount is referred to as "an upward color filter shift amount of 7.5°". Further, at the lower edge portion of the display surface, the center of the red color filter 118 is disposed at a position shifted downward (outward) with respect to the center of the red sub-pixel 115. The shift amount of the center of the red color filter 118 with respect to the center of the red sub-pixel 115 is set such that a straight line passing through the center of the red sub-pixel 115 and the center of the red color filter 118 tilts downward with respect to the normal direction by 7.5°. In the following description, this shift amount is referred to as "a downward color filter shift amount of 7.5°". The same applies to the green color filter and the blue color filter.

Shifting the color filter with respect to the sub-pixel in this way improves the luminance and color shift at the upper and lower edge portions of the display surface.

As described above, in this embodiment, at the central portion of the display surface, the viewing angle characteristics of the display surface in the normal direction can be made higher than those in the specific direction tilted outward from the normal direction. On the other hand, at the edge portions of the display surface, the viewing angle characteristics in the normal direction can be made lower than those in the specific direction.

Figure 8:
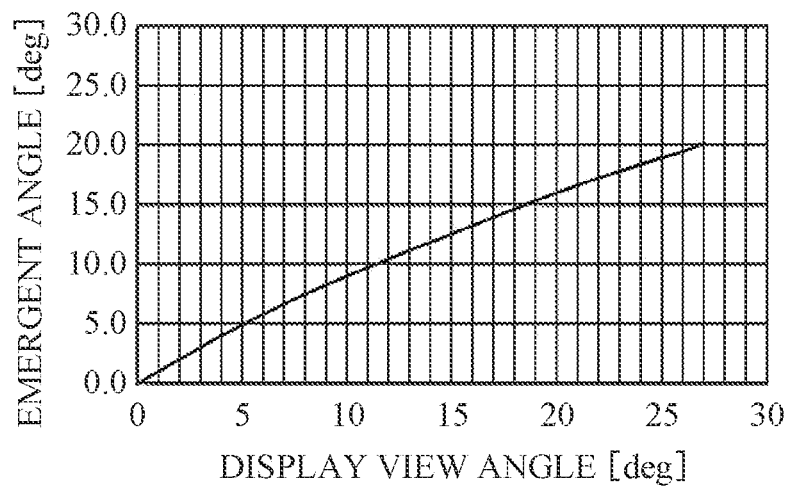
FIG. 8 illustrates a relation between display view angles and emission angles from an image surface in Embodiment 1.
Figure 9A:
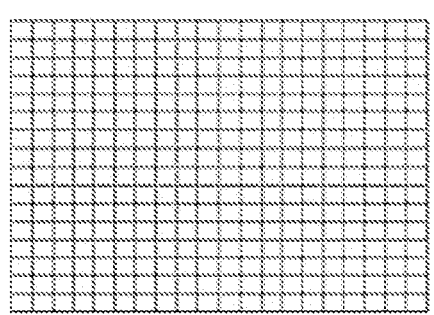
FIGS. 9A and 9B illustrate other color filters in Embodiment 1.
Figure 9B:
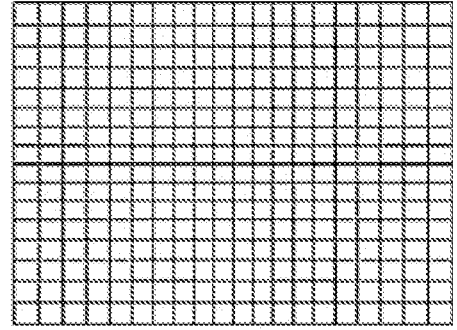

FIG. 8 illustrates a relation between the display view angle of the ocular optical system OR1 and the emergent angle of the principal ray from the display element (display surface) 108 in the front viewing state in this embodiment. As can be seen from this drawing, the emergent angle from the display surface increases as the display view angle increases. Therefore, it is necessary to increase the shift amount of the color filter with respect to the sub-pixel from the central portion to the edge portion of the display surface. In this case, as illustrated in FIG. 9A (the red, green and blue sub-pixels are collectively illustrated in one frame), the pitch of the sub-pixels is constant from the central portion to the edge portion of the display surface. On the other hand, as illustrated in FIG. 9B, the pitch of the color filter increases from the central portion to the edge portion.

Therefore, the color filters may have sizes that increase as the pitch thereof increases. As the size of the color filter increases, an angle of light emitted from the sub-pixel and transmitted through the color filter increases, so that the viewing angle characteristics are further improved.

Next, description will be made of generation of ghost light as unwanted light in the ocular optical systems OR1 and OL1 in this embodiment with reference to FIG. 10. The description will be made using the right-eye ocular optical system OR1, and the same applies to the left-eye ocular optical system OL1.

Figure 10:
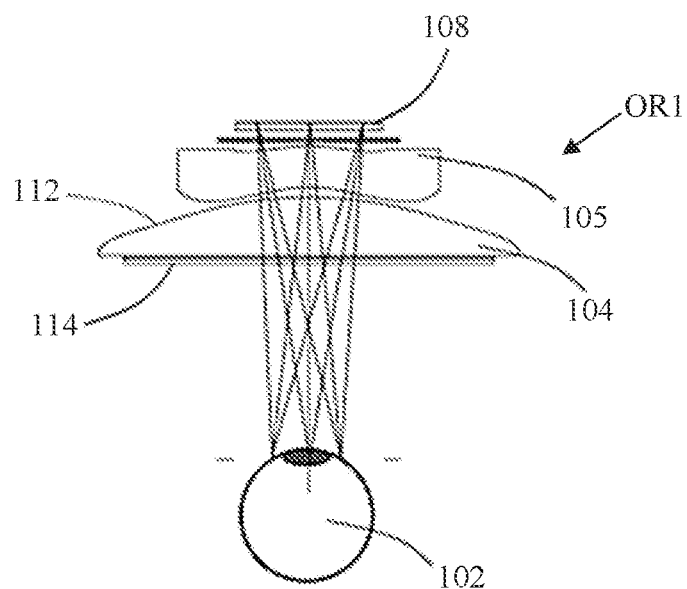
FIG. 10 illustrates a ghost optical path in Embodiment 1.

In the ocular optical system OR1 in this embodiment using the polarization of light, due to birefringence in the display lenses 104 and 105 and polarization characteristics of the polarizing plate 110, $\lambda/4$ plates 111 and 113 and PBS 114, light emitted from the display element 108 may be introduced to the observer's right eye 102 without being reflected by the PBS 114 as illustrated in FIG. 10, which is not a normal optical path illustrated in FIGS. 1 and 4. This light becomes the ghost light.

This ghost light is generated as follows. The circularly polarized light transmitted through the first $\lambda/4$ plate 111 becomes an elliptically polarized light by the birefringence in the display lenses 105 and 104. The elliptically polarized light is transmitted through the second $\lambda/4$ plate 113 to become a linearly polarized light whose polarization direction is tilted with respect to its original direction, and then is transmitted through the PBS 114 to be introduced as the ghost light to the right eye 102. Further, even if there is no birefringence in the display lenses 104 and 105, the ghost light is generated when the polarization characteristics of the polarizing plate 110, $\lambda/4$ plates 111 and 113 and PBS 114 are not good.

As to the ghost light illustrated in FIG. 10, in the front viewing state, the emergent angle of a principal ray of a maximum marginal view angle of 22.5° in the horizontal direction from the display element (display surface) 108 is 11°. The emergent angle of 11° is tilted with respect to the normal to the display surface to the opposite side to the emergent angle of the normal principal ray illustrated in FIGS. 1 and 4. Therefore, shifting the color filter with respect to the sub-pixel according to the emergent angle of the normal principal ray as described above can not only improve the viewing angle characteristics, but also reduce luminance of the ghost light from a marginal portion of the display surface including the edge portion.

Since birefringence in a lens generally increases from its central portion to its marginal portion, the intensity of the ghost light due to the birefringence in the lens also increases from the central portion to the marginal portion. Therefore, to reduce the ghost light passing through a marginal portion of the lens, reducing the luminance of the light from the marginal portion of the display surface is effective. Specifically, the luminance of the ghost light from the horizontal edge portion of the display surface when the color filter is not shifted with respect to the sub-pixel is 96%, whereas the luminance when the color filter is shifted can be reduced to 87%. The same applies to the vertical direction.

In this embodiment, the outward color filter shift amount at the horizontal edge portion of the display surface for the principal ray of a display view angle of 22.5° is 10°. The outward color filter shift amount at the vertical edge portion of the display surface for the principal ray of a display view angle of 17° is 7.5°. The viewing angle characteristics in these directions are better than those in the normal direction.

It is desirable that the outward color filter shift amount (that is, a tilt angle in the specific direction with respect to the normal direction) φ with respect to the sub-pixel (hereinafter simply referred to as "a pixel") in portions other than the central portion of the display surface satisfy the following conditional expression (2):

$$0 < \varphi \leq \theta1. \quad (2)$$

In the conditional expression (2), θ1 represents, when the eyeball faces a direction of the display view angle corresponding to a pixel A, an emergent angle of the principal ray in that direction. The emergent angle is positive in a direction outward of the display surface. In this embodiment, θ1 at the display view angle of 22.5° is 37°, and θ1 at the display view angle of 17° is 29°. Therefore, the outward color filter shift amounts φ=10° and 7.5° at the pixel A corresponding to these display view angles satisfy the conditional expression (2).

When the outward color filter shift amount φ is 0° or less, that is, when the viewing angle characteristics in the normal direction or an inner direction are good, the difference between the emergent angle of the principal ray from the marginal portion of the display surface and the direction in which the viewing angle characteristics are good becomes large, and thereby the luminance reduction and color shill in a marginal portion of the observed image becomes large, which makes it impossible for the observer to observe a natural image. Further, the emergent angle of the ghost light from the display surface and the direction in which the viewing angle characteristics are good become close to each other, which increases the intensity of the ghost light.

On the other hand, when the outward color filter shift amount φ is larger than θ1, the difference in the front viewing state between the emergent angle of the principal ray from the marginal portion of the display surface and the direction in which the viewing angle characteristics are good becomes large, and thereby the luminance reduction and color shift at the marginal portion of the observed image viewed from the front becomes large.

When the maximum display view angle is 60° or less (54°) as in this embodiment, it is desirable to further satisfy the following conditional expression (3):

$$\theta2/2 \leq \varphi \leq \theta2. \quad (3)$$

In the conditional expression (3), θ2 represents an emergent angle of the principal ray from the display surface in a direction of the display view angle corresponding to the pixel A in the front viewing state. The emergent angle is positive in a direction outward of the display surface. In this embodiment, θ2 at the display view angle of 22.5° is 18°, and θ2 at the display view angle of 17° is 14°. Therefore, the outward color filter shift amounts φ at the pixels corresponding to the respective display view angles satisfy the conditional expression (3). When the maximum display view angle is 60° or less, the observer can recognize also the marginal portion of the observed image in the front viewing state, so that it is desirable to set the color filter shift amount assuming the front viewing state.

Further, it is desirable that an outward color filter shift amount φ max at the horizontal edge portion of the display surface satisfy the following conditional expression (4):

$$|\varphi \text{ max} - \theta3| \geq 15°. \quad (4)$$

In the conditional expression (4), θ3 represents an emergent angle of the ghost light (principal ray) of the maximum marginal view angle in the horizontal direction from the display surface. The emergent angle is positive in the direction outward of the display surface, and is negative in a direction toward the center thereof. In this embodiment, φ max is 10°, and θ3 is −11°, which satisfy the conditional expression (4). When |φ max−θ3| is less than 15°, the emergent angle of the ghost light from the display surface and the direction in which the viewing angle characteristics are good become close to each other, which increases the intensity of the ghost light.

In this embodiment, the configuration in which the color filter is shifted with respect to the pixel controls the emergent angle of the light from the display element. This configuration can reduce the ghost light while improving the viewing angle characteristics such as the luminance and the color shift at the marginal portion of the observed Image.

The birefringence in the lens is likely to occur when the lens is manufactured by metallic molding using a resin material. Further, the birefringence becomes larger as an uneven thickness ratio of the lens becomes larger because the difference between temperatures of a thin portion and a thick portion of the lens during cooling after the metallic molding increases.

In the ocular optical system OR1 in this embodiment as a wide view angle and thin ocular optical system, the uneven thickness ratio of the display lens 104 provided with the reflective surface (half mirror 112) having a largest optical power becomes large. The uneven thickness ratio in an optically effective area of the display lens 104 is 2.0, which is desirable to be 1.5 or more and 4.0 or less. When the uneven thickness ratio is less than 1.5, it is necessary that the display lens 104 have a reduced optical power, which increases the radius of curvature or thickness of the display lens 104.

The reduced optical power of the display lens 104 makes it impossible to realize a wide view angle, or makes it necessary to add a lens having a large optical power and thereby makes it impossible to reduce the thickness of the ocular optical system OR1. Further, the increased thickness of the display lens 104 makes it impossible to reduce the thickness of the ocular optical system OR1. On the other hand, when the uneven thickness ratio is larger than 4.0, the birefringence of the display lens 104 becomes too large, and thereby the intensity of the ghost light increases.

When a thickness L1 of the ocular optical system OR1 is defined as a distance from the exit pupil-side surface of the PBS 114 to the display element 108, the thickness L1 is 13 mm, and a ratio L1/E1 of the thickness L1 and the eye relief E1(=18 mm) is 0.72. It is desirable that the ratio L1/E1 satisfy the following conditional expression (5) to secure an appropriate eye relief and to reduce the thickness of the ocular optical system OR1:

$$0.60 \leq L1/E1 \leq 1.00. \quad (5)$$

When L1/E1 is smaller than 0.60, the eye relief becomes too long, the outer diameter of the display lens 104 becomes large, which undesirably increases the size of the HMD 101. Moreover, as the outer diameter of the display lens 104 increases, the birefringence thereof increases, so that the intensity of the ghost light increases. On the other hand, when L1/E1 is larger than 1.00, the thickness of the ocular optical system OR1 increases, which undesirably increases the size of the HMD 101, and the eye relief becomes too short, which undesirably gives the observer a feeling of tightness or undesirably makes it impossible for the observer wearing glasses to wear the HMD 101.

Further, in this embodiment, the maximum diagonal half-view angle θ1 of the ocular optical system OR1 is 27°. Thus, E1×tan θ1 is 9.2 mm. It is desirable that E1×tan θ1 satisfy the following conditional expression (6) to secure an appropriate eye relief and to increase the display view angle of the ocular optical system OR1:

$$8 \text{ mm} \leq E1 \times \tan \theta1 \leq 20 \text{ mm}. \quad (6)$$

When E1×tan θ1 is smaller than 8 mm, the eye relief becomes too short, which undesirably gives the observer a feeling of tightness or undesirably makes it impossible for the observer wearing glasses to wear the HMD 101. In addition, the too short eye relief makes the display view angle of the ocular optical system too narrow, which makes it impossible for the observer to observe a natural image with a sense of presence.

On the other hand, when E1×tan θ1 is larger than 20 mm, the eye relief becomes too long and thereby the outer diameter of the display lens 104 becomes large, which undesirably increases the size of the HMD 101, Moreover, as the outer diameter of the display lens 104 increases, the birefringence of the display lens 104 increases, so that the intensity of the ghost light increases. Further, such a large outer diameter of the display lens 104 makes the display view angle too wide, which increases the emergent angle of the principal ray of the marginal view angle from the display surface to deteriorate the viewing angle characteristics.

Further, to reduce the ghost light due to external light and thereby increase contrast of the observed image, a polarizing plate may be disposed between the PBS 114 and the exit pupil of each ocular optical system.

Moreover, in this embodiment, as illustrated in FIG. 2, the exit pupil-side surface of the display lens 104 on which the second λ/4 plate 113 and the PBS 114 are formed so as to be laminated is made as a planar surface. This is to increase the eye relief and to reduce the thickness of the ocular optical system. If this surface has a concave shape toward the exit pupil, the display lens 104 becomes thicker in order to secure the eye relief at the marginal portion thereof. On the other hand, if this surface has a convex shape toward the exit pupil, the display lens 104 becomes thicker in order to secure the thickness of a lens edge portion of the display lens 104.

The conditions of the expressions (1) to (6) described in this embodiment also apply to Embodiment 2 described later. Further, the desirable material, shape and the like of each lens described in this embodiment also apply to Embodiment 2.

As the display element, a liquid crystal display panel that emits linearly polarized light may be used. In this case, the polarizing plate 110 can be omitted, and thereby the ocular optical system and the HMD can be further thinned. This is also the same in Embodiment 2.

Embodiment 2

Figure 11:
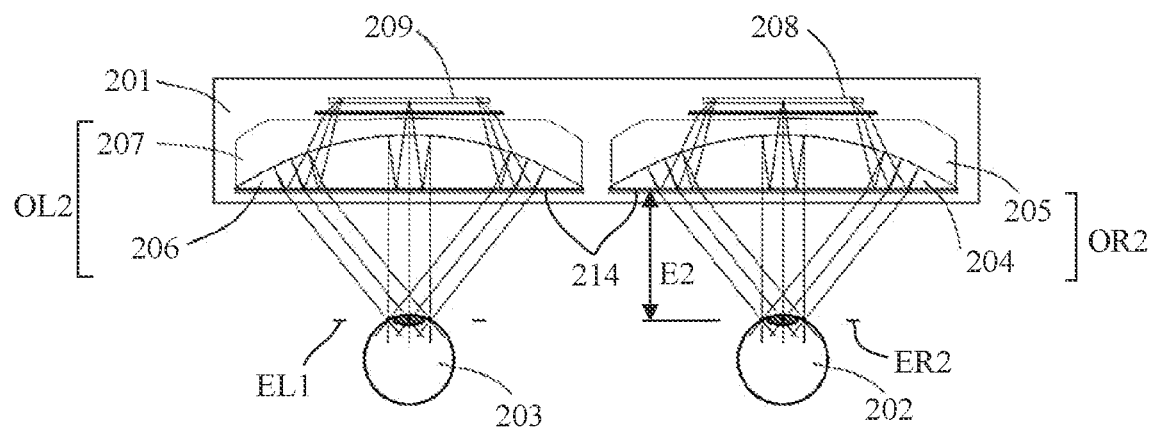
FIG. 11 illustrates a configuration of an HMD of Embodiment 2 of the present invention.

FIG. 11 illustrates a configuration of an HMD 201 that is a second embodiment (Embodiment 2) of the present invention. Reference numeral 202 denotes an observer's right eye, and reference numeral 203 denotes an observer's left eye. Display lenses 204 and 205 are included in a right-eye ocular optical system OR2, and display lenses 206 and 207 are included in a left-eye ocular optical system OL2. Each ocular optical system is a coaxial optical system including the two display lenses. The observer's right eye 202 is disposed at an exit pupil ER2 of the right-eye ocular optical system OR2, and the observer's left eye 203 is disposed at an exit pupil EL2 of the left-eye ocular optical system OL2.

Reference numeral 208 denotes a right-eye display element, and reference numeral 209 denotes a left-eye display element. Each display element is a flat plate display element. In this embodiment, the display element is an organic EL display panel.

The ocular optical systems OR2 and OL2 respectively introduce lights from the display elements 208 and 209 to the exit pupils ER2 and EL2 to project magnified virtual images of the display images (original images) onto the observer's right eye 202 and left eye 203. As a result, the observer can observe the virtual images of the display images displayed on the display elements 208 and 209 through the ocular optical systems OR2 and OL2.

In this embodiment, each ocular optical system has a focal length of 13 mm, a horizontal display view angle of 60°, a vertical display view angle of 60°, and a diagonal display view angle of 78°. An eye relief E2 that is a distance between a most exit pupil-side surface of each ocular optical system (that is, an exit pupil-side surface of a polarization beam splitter 214 described later) and the exit pupil of each ocular optical system is 20 mm.

Figure 12:
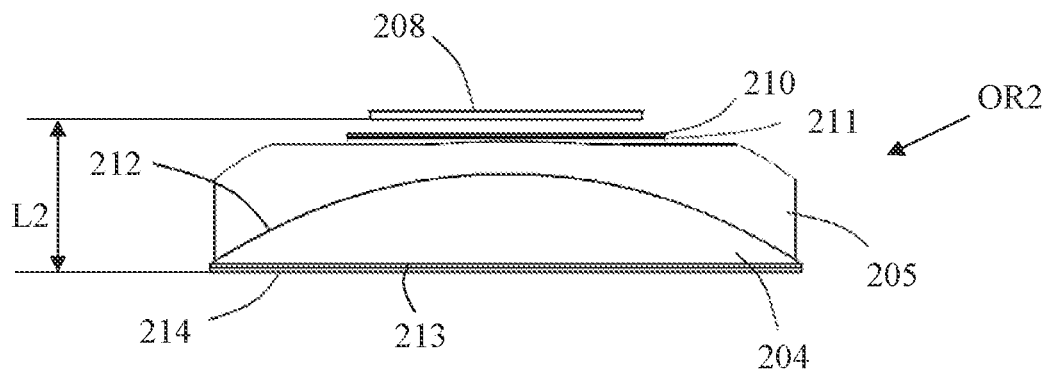
FIG. 12 illustrates a configuration of an ocular optical system in Embodiment 2.

Each of the right-eye and left-eye ocular optical systems OR2 and OL2 in this embodiment is, as in Embodiment 1, an optical system that folds an optical path by utilizing polarization of light. Description will hereinafter be made of a configuration of the right-eye ocular optical system OR2, The left-eye ocular optical system OL2 has the same configuration as that of the right-eye ocular optical system OR2. As illustrated in FIG. 12, the right-eye ocular optical system OR2 includes, in order from the right-eye display element 208 toward the exit pupil ER2, a polarizing plate 210, a first λ/4 plate 211, the display lens 205, the display lens 204, a second λ/4 plate 213, and the polarization beam splitter (hereinafter referred to as "PBS") 214. On a display element-side convex-shape surface of the display lens 204, a half mirror 212 as a semi-transmissive reflective surface is formed by vapor deposition. Further, the second λ/4 plate 113 and the PBS 114 are provided so as to be laminated on an exit pupil-side surface of the display lens 204.

The polarizing plate 210, the first λ/4 plate 211, the second λ/4 plate 213 and the PBS 214 are all formed in a flat plate shape, A polarization direction of a first linearly polarized light to be transmitted through the polarizing plate 210 is tilted with respect to a slow axis of the first λ/4 plate 211 by 45°. The polarization direction of the first linearly polarized light to be transmitted through the polarizing plate 210 is tilted with respect to a slow axis of the second λ/4 plate 213 by −45°. Further, the polarization direction of the first linearly polarized light to be transmitted through the polarizing plate 210 and a polarization direction of a second linearly polarized light to be transmitted through the PBS 214 are orthogonal to each other.

Non-polarized light emitted from the right-eye display element 208 is transmitted through the polarizing plate 210 to become linearly polarized light. The linearly polarized light is transmitted through the first λ/4 plate 211 to become circularly polarized light. The circularly polarized light is transmitted through the display lens 205, the half mirror 212 and the display lens 204, and then is transmitted through the second λ/4 plate 213 to become the first linearly polarized light.

This first linearly polarized light has the polarization direction orthogonal to the polarization direction to be transmitted through the PBS 214, and therefore is reflected by the PBS 214, and then is transmitted through the second λ/4 plate 213 to become circularly polarized light. This circularly polarized light is transmitted through the display lens 204, is reflected by the half mirror 212, is transmitted through the display lens 204 again, and then is transmitted through the second λ/4 plate 213 to become the second linearly polarized light. This second linearly polarized light has the polarization direction that coincides with the polarization direction to be transmitted through the PBS 214, and therefore is transmitted through the PBS 214 to be introduced to the exit pupil ER2 (right eye 202). Light emitted from the left-eye display element 209 is also introduced to the exit pupil EL2 (left eye 203) by the left-eye ocular optical system OL2.

Also in this embodiment, as in Embodiment 1, the configuration in which each ocular optical system folds the optical path using the polarization of light enables making each ocular optical system thin, and enables shortening the focal length of each ocular optical system so as to be able to observe a wide view angle image.

In this embodiment, the two display lenses included in the ocular optical system are cemented to each other, and thereby the thickness of the ocular optical system in its optical axis direction is reduced to 13.5 mm. As described above, the eye relief E2 of the ocular optical system is set to 20 mm. Using the two display lenses as a cemented lens facilitates holding the display lenses by a main body of the HMD 201.

Also in this embodiment, the display lenses 204 to 207 are made as resin lenses, and the display lenses 204 to 207 are made as aspheric lenses to enhance their aberration correction effect.

Further, since the display lenses 204 and 205 are cemented to each other, the half mirror 212 may be provided on an exit pupil-side surface of the display lens 205. Also in this case, the surface on which the half mirror is provide is a convex-shape surface toward the display element 208.

Figure 13:
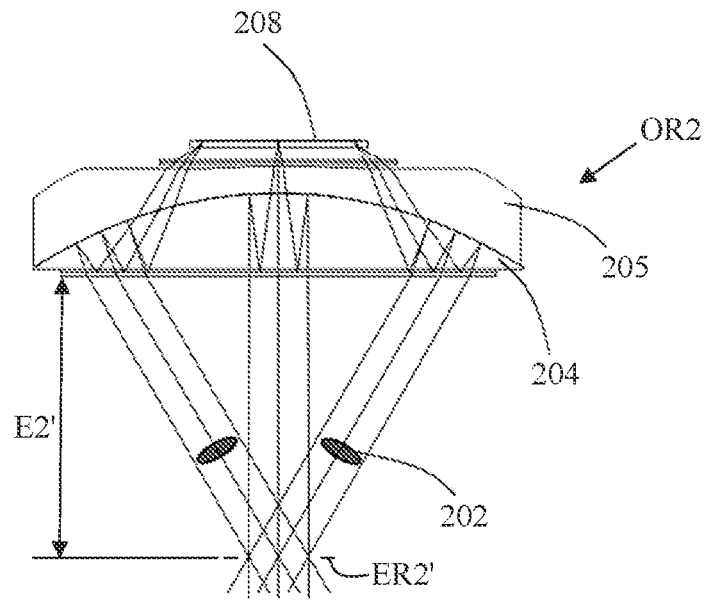
FIG. 13 is an optical path diagram of the ocular optical system in Embodiment 2.

Furthermore, in the HMD 201 of this embodiment, as illustrated in FIG. 13, a position of an exit pupil ER2' of the right-eye ocular optical system OR2, that is, an eye relief E2' in a state where an eyeball (pupil) of the right eye 202 faces (sees) the left and right edge portions of a display surface of the right-eye display element 208 is set to 30 mm. This eye relief E1' (=30 mm) is the sum of the eye relief E2 (=20 mm) when the eyeball faces the center of the display surface as illustrated in FIG. 11 and a rotation radius of 10 mm of the eye ball. An exit pupil diameter is set to 6 mm. The same applies to the exit pupil of the left-eye ocular optical system OL2. Such setting makes it possible to cause light from a direction in which the eyeball faces to enter the eyeball even if the eyeball is rotated to observe the left and right edge portions (similarly, upper and lower edge portions) of the display surface.

Also in this embodiment, as in Embodiment 1, the color filters are shifted with respect to the pixels on the display elements (display surfaces) 208 and 209. In the right-eye ocular optical system OR2, a light ray emitted from the right-eye display element (display surface) 208 and passing through the center of the exit pupil ER2 (ER2') of the right-eye ocular optical system OR2 is referred to as "a principal ray". In this embodiment, when the eyeball faces the center of the display surface as illustrated in FIG. 11, a principal ray of a maximum marginal view angle of 30° in a right-and-left (horizontal) direction emits from the display surface at an emergent angle of 23°. On the other hand, when the eyeball faces the horizontal edge portion of the display surface as illustrated in FIG. 13, the principal ray of the maximum marginal view angle of 30° in the horizontal direction emits from the display surface at an emergent angle of 47°.

The viewing angle characteristics (luminance and color shift ΔE) of the display element having a general configuration are as illustrated in FIGS. 5A and 5B.

Figure 14C:
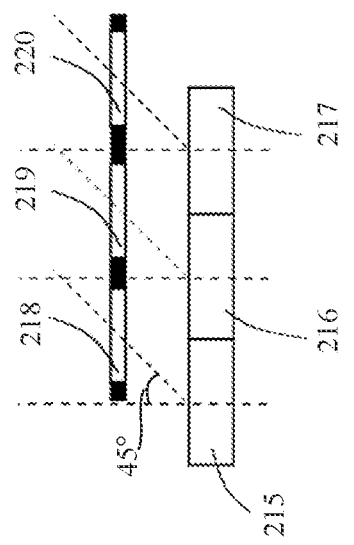
FIGS. 14A to 14C illustrate color filters in Embodiment 2.
Figure 14B:
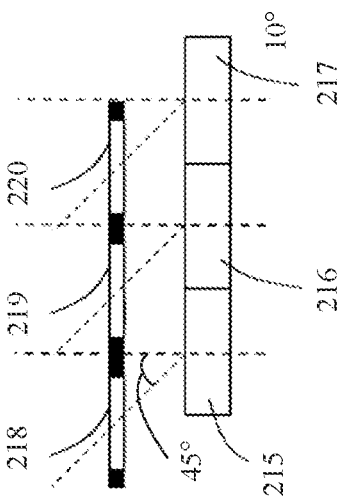
Figure 14A:
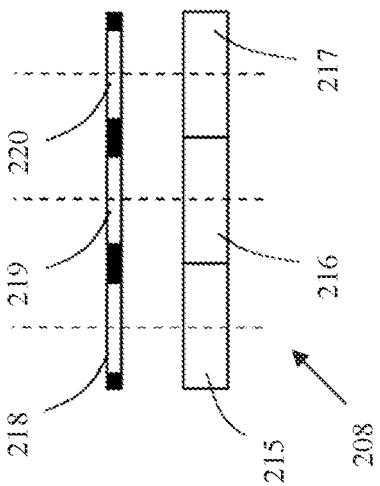

In this embodiment, the display elements 208 and 209 are configured as illustrated in FIGS. 14A to 14C, Although description is herein made of the configuration of the right-eye display element 208 in the horizontal direction, the same applies to the left-eye display element 209.

The display element 208 in this embodiment also includes multiple red, green and blue sub-pixels 215, 216 and 217 and multiple red, green and blue color filters 218, 219 and 220 corresponding thereto. The red, green and blue sub-pixels and color filters are arranged in a stripe shape and periodically in an in-plane direction (horizontal and vertical directions) of the display surface. Further, also in this embodiment, the normal direction in which the normal to the display surface of the display element 208 extends is defined as a 0° direction. When viewing from the right eye 102, a right side is defined as positive, and a left side is defined as negative.

As illustrated in FIG. 14A, at the central portion of the display element 208, the center of the red color filter 218 is located in the normal direction from the center of the red sub-pixel 215 as in general display elements. That is, in the horizontal direction, the center position of the red color filter 118 coincides with the center position of the red sub-pixel 215. Similarly, in the horizontal direction, the center position of the green color filter 219 coincides with the center position of the green sub-pixel 216, and the center position of the blue color filter 220 coincides with the center position of the blue sub-pixel 217.

On the other hand, as illustrated in FIG. 14B, at the left edge portion of the display element 208 when viewed from the right eye 202, the center of the red color filter 218 is disposed so as to be shifted leftward (outward) with respect to the center of the red sub-pixel 215. The center of the red color filter 218 is shifted with respect to the center of the red sub-pixel 215 by a shift amount by which a straight line passing through the center of the red sub-pixel 215 and the center of the red color filter 218 is tilted leftward with respect to the normal direction by 45°. In the following description, this shift amount is referred to as that "a leftward (outward) color filter shift amount of 45°". The same applies to the green color filter 219 and the blue color filter 220.

Further, as illustrated in FIG. 14C, at the right edge portion of the display element 208 when viewed from the right eye 202, the center of the red color filter 218 is disposed so as to be shifted rightward (outward) with respect to the center of the red sub-pixel 215. The center of the red color filter 218 is shifted with respect to the center of the red sub-pixel 215 by a shift amount by which a straight line passing through the center of the red sub-pixel 215 and the center of the red color filter 218 is tilted rightward with respect to the normal direction by 45°. In the following description, this shift amount is referred to as that "a rightward (outward) color filter shift amount of 45°", The same applies to the green color filter 219 and the blue color filter 220.

The luminance and color shift of the display element 108 having such a configuration are respectively as illustrated in FIGS. 7A and 7B, and become best in a direction of −45° as a specific direction.

The emergent angle of the principal ray from the left edge portion of the display element (display surface) 208 to the ocular optical system OR2 is −23° in a front viewing state where the eyeball of the right eye 202 faces the center of the display surface, and is −47° in a left edge viewing state where the eyeball faces the left edge portion of the display surface.

If the color filter is not shifted with respect to the sub-pixel at the left edge portion of the display surface in the front viewing state, as can be seen from FIGS. 5A and 5B, the luminance decreases by 15%, and ΔE increases by 5.

Figure 15C:
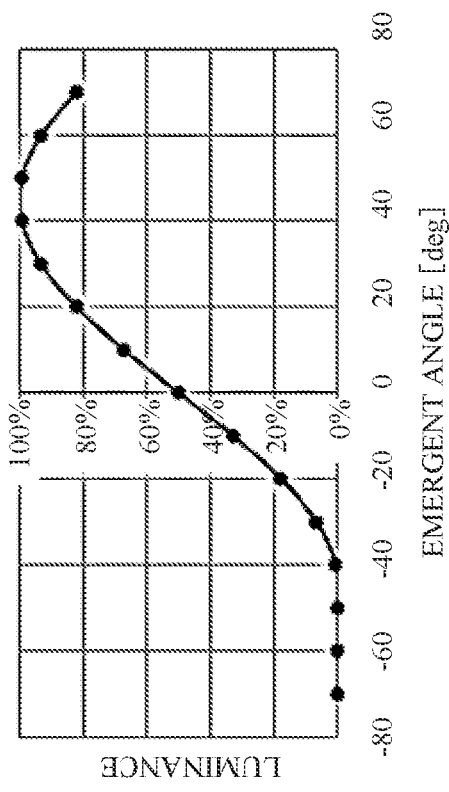
FIGS. 15A to 15D illustrate viewing angle characteristics at a central portion of a display surface in Embodiment 1.
Figure 15D:
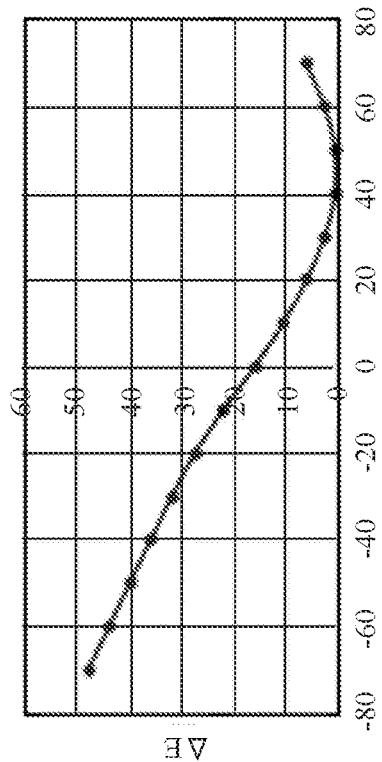
Figure 15A:
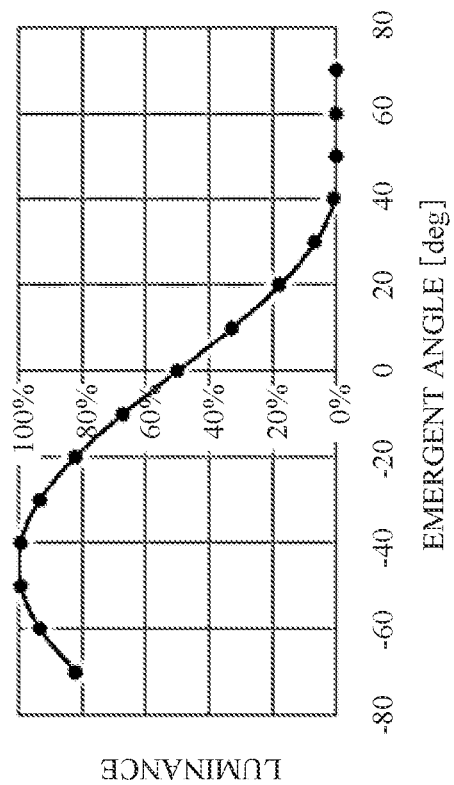
Figure 15B:
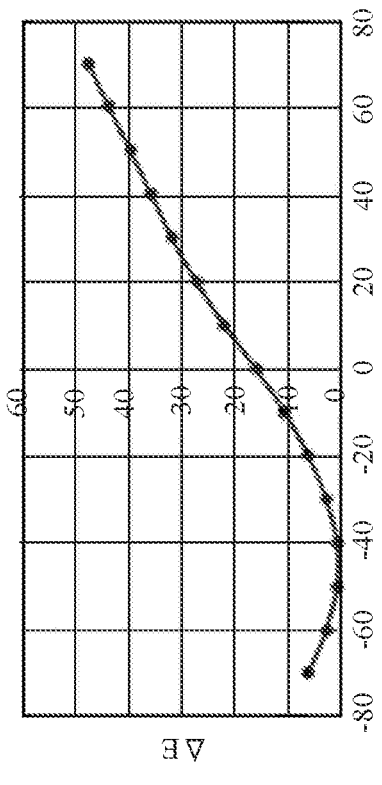

However, when the color filter is shifted, as can be seen from FIGS. 15A and 15B, the luminance decreases by only 14%, and ΔE increases by only 4. That is, the viewing angle characteristics are improved.

On the other hand, if the color filter is not shifted at the left edge portion of the display surface in the left edge viewing state, as can be seen from FIGS. 5A and 5B the luminance decreases by 53%, and ΔE increases by 17. However, when the color filter is shifted, as can be seen from FIGS. 15A and 15B, the luminance decreases by only 1%, and ΔE increases by only 1. That is, the viewing angle characteristics are significantly improved.

Further, also in a right edge viewing state in which the eyeball of the right eye 202 faces the right edge portion of the display surface, as illustrated in FIGS. 15C and 15D, as in the left edge viewing state, shifting the color filter with respect to the sub-pixel improves the luminance and color shift compared to the case where the color filter is not shifted with respect to the sub pixel.

The description has been made of the shift of the color filter with respect to the sub-pixel at the horizontal edge portions. In this embodiment, also at the vertical edge portions (upper and lower edge portions), the color filter is similarly shifted with respect to the sub-pixel.

In this embodiment, the emergent angle of the principal ray of the maximum marginal view angle of 30° in the vertical direction from the display element (display surface) 208 in the front viewing state is 23°. In an upper edge viewing state and a lower edge viewing state where the eyeball faces the upper edge portion and the lower edge portion in the vertical direction, the emergent angle of the principal ray of the maximum marginal view angle of 30° in the vertical direction from the display surface is 47°.

At the upper edge portion of the display surface, the center of the red color filter 218 is disposed so as to be shifted upward (outward) with respect to the center of the red sub-pixel 215. The center of the red color filter 218 is shifted with respect to the center of the red sub-pixel 215 by a shift amount by which a straight line passing through the center of the red sub-pixel 215 and the center of the red color filter 218 is tilted upward with respect to the normal direction by 45°. In the following description, this shift amount is referred to as "an upward (outward) color filter shift amount of 45°".

Further, at the lower edge portion of the display surface, the center of the red color filter 218 is disposed so as to be shifted downward (outward) with respect to the center of the red sub-pixel. The center of the red color filter 218 is shifted with respect to the center of the red sub-pixel 215 by a shift amount by which a straight line passing through the center of the red sub-pixel 215 and the center of the red color filter 218 is tilted downward with respect to the normal direction by 45°. In the following description, this shift amount is referred to as "a downward (outward) color filter shift amount of 45°". The same applies to the green color filter and the blue color filter.

Shifting the color filter with respect to the sub-pixel in this way improves the luminance and color shift at the upper and lower edge portions of the display surface.

As described above, also in this embodiment, at the central portion of the display surface, the viewing angle characteristics of the display surface in the normal direction can be made higher than that in the specific direction tilted outward from the normal direction. On the other hand, at the edge portions of the display surface, the viewing angle characteristics in the normal direction can be made lower than that in the specific direction.

Further, also in this embodiment, as illustrated in FIG. 9A, the pitch of the sub-pixels is constant from the central portion to the edge portion of the display surface. On the other hand, as illustrated in FIG. 9B, the pitch of the color filter increases from the central portion to the edge portion. Therefore, the color filters have sizes that increase as the pitch thereof increases.

Figure 16:
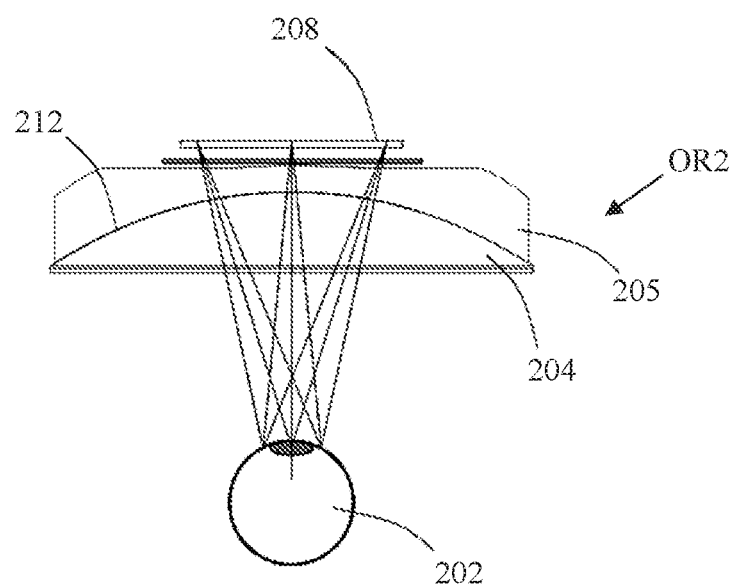
FIG. 16 illustrates a ghost optical path in Embodiment 2.

Also in the ocular optical systems OR2 and OL2 in this embodiment, ghost light is generated for the same reason as in Embodiment 1. As illustrated in FIG. 16, in the front viewing state, the emergent angle of a principal ray of a maximum marginal view angle of 30° in the horizontal direction from the display element (display surface) 208 is 15°. The emergent angle of 15° is tilted with respect to the normal to the display surface to the opposite side to the emergent angle of the normal principal ray illustrated in FIGS. 11 and 13. Therefore, shifting the color filter with respect to the sub-pixel according to the emergent angle of the normal principal ray as described above can not only improve the viewing angle characteristics, but also reduce luminance of the ghost light from the marginal portion of the display surface including the edge portion.

Specifically, the luminance of the ghost light from the horizontal edge portion of the display surface when the color filter is not shifted with respect to the sub-pixel is 93%, whereas the luminance when the color filter is shifted can be reduced to 25%. The same applies to the vertical direction.

In this embodiment, the outward color filter shift amount at the horizontal and vertical edge portions of the display surface with respect to the principal ray of a display view angle of 30° is 45°. The viewing angle characteristics in these directions are better than those in the normal direction.

Further, when $\theta 1$ represents the same emergent angle as that in Embodiment 1, $\theta 1$ at the display view angle of 30° in this embodiment is 47°, so that the outward color filter shift amount $\varphi(=45°)$ satisfies the conditional expression (2). Moreover, when the maximum display view angle (=78°) is larger than 60° as in this embodiment, it is more desirable to satisfy the following conditional expression (7) where $\theta 2$ represents the same emergent angle as that in Embodiment 1:

$$\theta 2 \leq \varphi \leq \theta 1. \quad (7)$$

In this embodiment, since $\theta 2$ at the display view angle of 30° is 23°, the color filter shift amount $\varphi$ satisfies the conditional expression (7).

When the maximum display view angle is larger than 60°, the display view angle is too wide for the observer to recognize a marginal portion of the observed image in the front viewing state, Therefore, it is desirable to set the color filter shift amount, not in the front viewing state, but in a state where the observer sees the marginal portion of the observed image, on the basis of an emergent angle of a principal ray from the display surface in a direction in which the observer sees the marginal portion.

Further, the outward color filter shift amount $\varphi$ max at the horizontal edge portion of the display surface is 45°, and $\theta 3$ is −15°, so that the conditional expression (3) is satisfied. As a result, the ghost light can be reduced.

This embodiment gives priority to reducing the ghost light in the upper edge viewing state and the lower edge viewing state to set the outward color filter shift amount at the horizontal and vertical edge portions in the display view angle of 30° to a large amount of 45°. However, when improvement of the viewing angle characteristics of the marginal portion in the front viewing state is desired even if the display view angle is large, the outward color filter shift amount at the horizontal and vertical edge portions in the display view angle of 30° may be matched to the emergent angle of 23° of the principal ray of the horizontal maximum marginal view angle of 30° from the display surface in the front viewing state.

In addition, the color filter shift amount may be set to 35° that is an average of the emergent angle of 23° of the principal ray of the horizontal maximum marginal view angle of 30° from the display surface in the front viewing state and the emergent angle of 47° of the principal ray of the horizontal maximum marginal view angle of 30° from the display surface in the left edge and right edge viewing states.

In this case, when the color filter is not shifted at the left edge portion of the display surface in the front viewing state, the luminance decreases by 15%, and ΔE increases by 5. However, when the color filter is shifted, the luminance decreases by only 4%, and ΔE increases by only 2. That is, the viewing angle characteristics are improved.

On the other hand, in the left edge viewing state, when the color filter is not shifted at the left edge portion of the display surface, the luminance decreases by 53%, and ΔE increases by 17. However, when the color filter is shifted, the luminance decreases by only 4%, and ΔE increases by only 2. That is, the viewing angle characteristics are significantly improved.

Further, when the color filter is not shifted, the luminance of the ghost light from the horizontal edge portion of the display surface is 93%, whereas when the color filter is shifted, the luminance of the ghost light is significantly reduced to 41%. As described above, in this embodiment, the viewing angle characteristics of the normal light in the front viewing state, the left edge viewing state and the right edge viewing state can be improved in a well-balanced manner, and the ghost light can also be reduced.

Also in this embodiment, the configuration in which the color filter is shifted with respect to the pixel controls the emergent angle of the light from the display element. This configuration can reduce the ghost light while improving the viewing angle characteristics such as the luminance and the color shift at the marginal portion of the observed image.

Also in this embodiment, since the right-eye ocular optical system OR2 has a wide view angle and thin, the display lens 204 having the reflective surface (half mirror 212) whose optical power is largest has a large uneven thickness ratio. Further, since the display lenses 204 and 205 are cemented to each other, the radius of curvature of a cemented surface of the display lens 205 to the display lens 204 is short, and the uneven thickness ratio of the display lens 205 also becomes large. In this embodiment, the uneven thickness ratio in an optically effective area of the display lens 204 is 3.6, and the uneven thickness ratio in an optically effective area of the display lens 205 is 2.8.

Furthermore, when a thickness L2 of the right-eye ocular optical system OR2 is defined as a distance from the exit pupil-side (observer's right eye-side) surface of the PBS 214 to the right-eye display element 208, the thickness L2 is 13.5 mm. The eye relief E2 of the right-eye ocular optical system OR2 is 20 mm. The ratio L2/E2 of the thickness L2 and the eye relief E2 is 0.68.

In this embodiment, the maximum diagonal half view angle θ2 of the right-eye ocular optical system OR2 is 39°. Thus, E2×tan θ2 is 16.2 mm, which satisfies the conditional expression (6). The same applies to the uneven thickness ratio, L2/E2 and E2×tan θ2 of the left-eye ocular optical system OL2.

Further, also in this embodiment, a polarizing plate may be disposed between the PBS 214 and the exit pupil of each ocular optical system in order to reduce the ghost light due to the external light and increase the contrast of the observed image.

Each of the above embodiments has described, as the configuration for controlling the emergent angle of the light from the display element, the configuration in which the color filter is shifted with respect to the pixel, However, as long as capable of controlling the emergent angle of the light from the display element, other configurations may be employed such as one including a microlens array.

Each of the above-described embodiment can reduce the ghost light while improving the viewing angle characteristics at the marginal view angle of the ocular optical system using the polarization of light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-015848, filed on Jan. 31, 2020 which is hereby incorporated by reference herein in its entirety.

What is claimed is:

1. An image display apparatus comprising:
a display element having a display surface configured to display an image; and
an optical system configured to introduce light from the display surface to an observer,
wherein the optical system includes in order from the display element toward the observer:
a first phase plate;
a semi-transmissive reflective surface;
a lens;
a second phase plate; and
a polarization beam splitter configured to reflect a first linearly polarized light and transmit a second linearly polarized light whose polarization direction is orthogonal to that of the first linearly polarized light,
wherein, when a direction in which a normal to the display surface extends is referred to as a normal direction, and a direction tilted outward of the display surface with respect to the normal direction is referred to as a specific direction, luminance in the normal direction is higher than that in the specific direction at a central portion of the display surface, and luminance in the normal direction is lower than that in the specific direction at a most edge portion of the display surface, and
wherein the following inequality is satisfied:

$$|\varphi \max - \theta 3| \geq 15°$$

where φ max represents an angle between the specific direction and the normal direction at the most edge portion, and θ3 represents an emergent angle of a principal ray of first light proceeding from the most edge portion to a center of an exit pupil, the first light being transmitted through the semi-transmissive reflective surface and then being transmitted through the polarization beam splitter.

2. The image display apparatus according to claim 1, wherein the display element is configured to make, at the central portion, color shift in the normal direction smaller than that in the specific direction, and to make, at the most edge portion, the color shift in the normal direction larger than that in the specific direction.

3. The image display apparatus according to claim 1, wherein:
- the display element includes multiple color filters corresponding to multiple pixels;
- on a normal to a center of a first pixel located at the central portion, a center of a color filter corresponding to the first pixel among the multiple color filters is disposed; and
- with respect to a normal to a center of a second pixel located at the most edge portion, a center of a color filter corresponding to the second pixel among the multiple color filters is shifted outward.

4. The image display apparatus according to claim 3, wherein the color filter corresponding to the second pixel has a size larger than that of the color filter corresponding to the first pixel.

5. The image display apparatus according to claim 1, wherein, when $\varphi$ represents an angle of the specific direction with respect to the normal direction, and $\theta 1$ represents an emergent angle of a principal ray from the display surface, the principal ray proceeding from the most edge portion to a center of the exit pupil of the optical system, in a state where an eyeball of the observer located at the exit pupil faces the most edge portion, the following condition is satisfied:

$$0 < \varphi \leq \theta 1.$$

6. The image display apparatus according to claim 5, wherein, when a maximum display view angle of the optical system is 60° or less, and $\theta 2$ represents an emergent angle of the principal ray from the display surface, the principal ray proceeding from the most edge portion to the center of the exit pupil, the following condition is satisfied:

$$\theta 2/2 \leq \varphi \leq \theta 2.$$

7. The image display apparatus according to claim 5, wherein, when a maximum display view angle of the optical system is larger than 60°, and $\theta 2$ represents an emergent angle of the principal ray from the display surface, the principal ray proceeding from the most edge portion to the center of the exit pupil, the following condition is satisfied:

$$\theta 2 \leq \varphi \leq \theta 1.$$

8. The image display apparatus according to claim 1, wherein:
- the semi-transmissive reflective surface is provided on a surface of the lens; and
- the surface of the lens is a convex-shape surface toward the display element.

9. The image display apparatus according to claim 1, wherein:
- the semi-transmissive reflective surface is provided on a surface of the lens; and
- the surface of the lens is an aspheric surface.

10. The image display apparatus according to claim 1, wherein, of at least one lens included in the optical system, a lens closest to the observer is a plano-convex lens having a convex shape toward the display element.

11. The image display apparatus according to claim 1, wherein:
- the semi-transmissive reflective surface is provided on the lens; and
- an uneven thickness ratio of an optically effective area of the lens is 1.5 or more and 4 or less.

12. The image display apparatus according to claim 1, wherein, when E represents an eye relief of the optical system, the following condition is satisfied:

$$15 \text{ mm} \leq E \leq 25 \text{ mm}.$$

13. The image display apparatus according to claim 1, wherein, when L represents a thickness of the optical system in its optical axis direction, and E represents an eye relief of the optical system, the following condition is satisfied:

$$0.6 \leq L/E \leq 1.0.$$

14. The image display apparatus according to claim 1, wherein, when E represents an eye relief of the optical system, and $\theta$ represents a maximum diagonal half-view angle of the optical system, the following condition is satisfied:

$$8 \text{ mm} \leq E \times \tan \theta \leq 20 \text{ mm}.$$

15. The image display apparatus according to claim 1, wherein a slow axis of the first phase plate and a slow axis of the second phase plate are tilted to mutually opposite sides with respect to the polarization direction of the first linearly polarized light.

16. The image display apparatus according to claim 1, wherein the optical system includes a polarizing plate disposed between the polarization beam splitter and the observer, and configured to transmit the second linearly polarized light.

17. The image display apparatus according to claim 1, wherein:
- the display element is configured to emit non-polarized light; and
- the optical system includes a polarizing plate disposed between the display element and the first phase plate, and configured to transmit the first linearly polarized light.

18. An image display apparatus comprising:
- a display element having a display surface configured to display an image; and
- an optical system configured to introduce light from the display surface to an observer,
- wherein the optical system includes in order from the display element toward the observer:
  - a first phase plate;
  - a semi-transmissive reflective surface;
  - a lens;
  - a second phase plate; and
  - a polarization beam splitter configured to reflect a first linearly polarized light and transmit a second linearly polarized light whose polarization direction is orthogonal to that of the first linearly polarized light,
- wherein, when a direction in which a normal to the display surface extends is referred to as a normal direction, and a direction tilted outward of the display surface with respect to the normal direction is referred to as a specific direction, color shift in the normal direction is smaller than that in the specific direction at a central portion of the display surface, and the color shift in the normal direction is larger than that in the specific direction at a most edge portion of the display surface, and
- wherein the following inequality is satisfied:

$$|\varphi \text{ max} - \theta 3| \geq 15°$$

where $\varphi$ max represents an angle between the specific direction and the normal direction at the most edge portion, and $\theta 3$ represents an emergent angle of a principal ray of first light proceeding from the most edge portion to a center of an exit pupil, the first light being transmitted through the semi-transmissive reflective surface and then being transmitted through the polarization beam splitter.

* * * * *